US007588817B2

(12) United States Patent
Argoitia et al.

(10) Patent No.: US 7,588,817 B2
(45) Date of Patent: Sep. 15, 2009

(54) ENGRAVED OPTICALLY VARIABLE IMAGE DEVICE

(75) Inventors: Alberto Argoitia, Santa Rosa, CA (US); Dishuan Chu, Rohnert Park, CA (US)

(73) Assignee: JDS Uniphase Corporation, San Jose, CA (US)

( * ) Notice: Subject to any disclaimer, the term of this patent is extended or adjusted under 35 U.S.C. 154(b) by 662 days.

(21) Appl. No.: 11/199,007

(22) Filed: Aug. 8, 2005

(65) Prior Publication Data

US 2006/0204724 A1 Sep. 14, 2006

Related U.S. Application Data

(60) Provisional application No. 60/660,837, filed on Mar. 11, 2005.

(51) Int. Cl.
*B32B 3/00* (2006.01)

(52) U.S. Cl. .................................................... 428/172

(58) Field of Classification Search ................ 346/74.3, 346/74.7; 434/409; 428/403
See application file for complete search history.

(56) References Cited

U.S. PATENT DOCUMENTS

| | | | | |
|---|---|---|---|---|
| 5,059,245 | A | 10/1991 | Phillips et al. | 106/22 |
| 5,171,363 | A | 12/1992 | Phillips et al. | 106/22 R |
| 5,364,689 | A | 11/1994 | Kashiwagi et al. | 428/195.1 |
| 6,114,018 | A | 9/2000 | Phillips et al. | 428/200 |
| 6,649,256 | B1 | 11/2003 | Buczek et al. | 428/323 |
| 6,838,166 | B2 | 1/2005 | Phillips et al. | 428/323 |
| 2002/0182383 | A1 | 12/2002 | Phillips et al. | 428/199 |
| 2004/0001961 | A1 * | 1/2004 | Ono et al. | 428/500 |
| 2004/0009309 | A1 * | 1/2004 | Raksha et al. | 427/598 |
| 2004/0051297 | A1 * | 3/2004 | Raksha et al. | 283/57 |
| 2005/0106367 | A1 | 5/2005 | Raksha et al. | 428/199 |
| 2005/0123755 | A1 * | 6/2005 | Argoitia et al. | 428/402 |

FOREIGN PATENT DOCUMENTS

| | | | |
|---|---|---|---|
| EP | 1 353 197 | | 10/2003 |
| EP | 1 741 757 | | 1/2007 |
| WO | 2004/024836 | | 3/2004 |
| WO | WO 2004/024836 | * | 3/2004 |
| WO | WO 2005/017048 | | 2/2005 |

* cited by examiner

*Primary Examiner*—Michael Cleveland
*Assistant Examiner*—Tabassom Tadayyon Eslami
(74) *Attorney, Agent, or Firm*—Pequignot + Myers LLC; Matthew A. Pequignot

(57) ABSTRACT

A method and image made by the method is disclosed wherein non-spherical magnetically alignable optical pigment flakes in transparent carrier are applied to a substrate and are aligned by applying a magnetic field to the substrate. The pigment flakes align along magnetic field lines and a tool for impressing or scribing the flakes is applied to a sub-region of the substrate to realign or remove flakes from a desired region. For example a scribing tool can be used to scribe a signature or other marks within the magnetically aligned flakes. The flakes are then cured and the image is preserved which has optical and tactile features.

4 Claims, 8 Drawing Sheets

Dark background printed and aligned over White and over Black

ENGRAVED OPTICALLY VARIABLE IMAGE DEVICE

CROSS-REFERENCE TO RELATED APPLICATIONS

The present invention claims priority from U.S. Patent Application No. 60/660,837 filed Mar. 11, 2005, which is incorporated herein by reference.

FIELD OF THE INVENTION

This invention relates generally to optically variable pigments, films, devices, and images, and more particularly to aligning or orienting magnetic flakes, such as during a painting or printing process, to obtain an illusive optical effect.

BACKGROUND OF THE INVENTION

Optically variable devices are used in a wide variety of applications, both decorative and utilitarian. Optically variable devices can be made in multitude of ways to achieve a variety of effects. Optically variable devices (OVDs) such as holograms are imprinted on credit cards and authentic software documentation; color-shifting images are printed on banknotes, and OVDs enhance the surface appearance of items such as motorcycle helmets and wheel covers.

Optically variable devices can be made as a film or a foil that is pressed, stamped, glued, or otherwise attached to an object, and can also be made using optically variable pigments. One type of optically variable pigment is commonly called a color-shifting pigment because the perceived color of images appropriately printed with such pigments changes as the angle of view and/or illumination is tilted. A common example is the number “20” printed with color-shifting pigment in the lower right-hand corner of a U.S. twenty-dollar banknote, which serves as an anti-counterfeiting device.

Some anti-counterfeiting devices are covert, while others are overt intended to be noticed. Unfortunately, some optically variable devices that are intended to be noticed are not widely known because the optically variable aspect of the device is not sufficiently dramatic or distinguishable from its background. For example, the amount of color-shift of an image printed with color-shifting pigment might not be noticed under uniform fluorescent ceiling lights, but may be more noticeable in direct sunlight or under single-point illumination. This can make it easier for a counterfeiter to pass counterfeit notes without the optically variable feature because the recipient might not be aware of the optically variable feature, or because the counterfeit note might look substantially similar to the authentic note under certain conditions.

Optically variable devices can also be made with magnetic pigments. These magnetic pigments may be aligned with a magnetic field after applying the pigment (typically in a carrier such as an ink vehicle or a paint vehicle) to a surface. However, painting with magnetic pigments has been used mostly for decorative purposes. For example, use of magnetic pigments has been described to produce painted cover wheels having a decorative feature that appears as a three-dimensional shape. A pattern was formed on the painted product by applying a magnetic field to the product while the paint medium still was in a liquid state. The paint medium had dispersed magnetic non-spherical particles that aligned along the magnetic field lines. The field had two regions. The first region contained lines of a magnetic force that were oriented parallel to the surface and arranged in a shape of a desired pattern. The second region contained lines that were non-parallel to the surface of the painted product and arranged around the pattern. To form the pattern, permanent magnets or electromagnets with the shape corresponding to the shape of desired pattern were located underneath the painted product to orient in the magnetic field non-spherical magnetic particles dispersed in the paint while the paint was still wet. When the paint dried, the pattern was visible on the surface of the painted product as the light rays incident on the paint layer were influenced differently by the oriented magnetic particles.

Similarly, a process for producing of a pattern of flaked magnetic particles in fluoropolymer matrix has been described. After coating a product with a composition in liquid form, a magnet with desirable shape was placed on the underside of the substrate. Magnetic flakes dispersed in a liquid organic medium orient themselves parallel to the magnetic field lines, tilting from the original planar orientation. This tilt varied from perpendicular to the surface of a substrate to the original orientation, which included flakes essentially parallel to the surface of the product. The planar oriented flakes reflected incident light back to the viewer, while the reoriented flakes did not, providing the appearance of a three dimensional pattern in the coating.

By way of background prior art, United States Patent Application 20050106367, incorporated herein by reference, published May 19, 2005 in the name of Raksha et al., assigned to JDS Uniphase Corporation, describes a method and apparatus for orienting magnetic flakes such as optically variable flakes.

Although some of the aforementioned methods for providing visually appealing and useful optical effects are now nearly ubiquitous, these devices require enhancements and additional features to make them more recognizable as an authentic article; for example it would be preferable to have the ability to provide yet additional security features.

For example it would be highly desirous to have a security device which provided a color shift with change in incident light or viewing angle including magnetically aligned flakes and optical features associated therewith; and, providing such a device which had a reasonable amount of tactility would be highly advantageous. It would also be preferably to have such a device wherein there was significant contrast and sharpness between regions of the device that Were functionally different. For example a magnetically aligned region of thin film color shifting flakes directly adjacent an embossed region could offer benefits not realizable in two adjacent different magnetically aligned regions.

It is an object of this invention to provide a method for forming an image of a plurality of contrasting, discernible regions, wherein at least one region has magnetic flakes thereon aligned by an applied magnetic field having a predetermined orientation, and another of the discernible regions adjacent to the first discernible region having flakes thereon or an absence of flakes caused by mechanically impressing or pushing away flakes from said second region.

It is an object of this invention to provide a tactile image wherein a tactile transition can be sensed by touching a transition between at least the first and second discernible regions.

It is an object of this invention to provide a banknote or security document which has tactile properties to assist the blind in verifying the authenticity of the note or document.

It is an object of this invention to provide an image having an optically variable region and having a tactile region about the optically variable region.

SUMMARY OF THE INVENTION

In accordance with the invention, there is provided, an image comprising:

a) a substrate and having a plurality of contrasting, discernible regions thereon, together defining an image, at least a first region of the discernible regions having magnetic flakes thereon having been aligned by an applied magnetic field having a predetermined orientation, and b) a second region of the discernible regions adjacent the first region having flakes thereon oriented differently than flakes in the first region, wherein, said orientation of the flakes in the second region being a result of mechanically impressing flakes within the second region, or ii) said second region having an absence of flakes caused by or pushing away flakes from said second region, the image forming a tactile image wherein a tactile transition can be sensed by touching a transition between the at least first and second discernible regions.

In accordance with the invention, there is further provided an image having a plurality of discernible tactile regions wherein two adjacent tactile discernible regions have different optical characteristics, and wherein one of the regions have magnetic flakes aligned differently and by different means than flakes within the adjacent region.

In accordance with this invention there is provided an image comprising a plurality of contrasting, discernible regions thereon, together defining an image, at least a first of the discernible regions having magnetic flakes thereon aligned by an applied magnetic field having a predetermined orientation, and a second of the discernible regions adjacent the first discernible region having flakes thereon or an absence of flakes caused by mechanically impressing or pushing away flakes from said second region, the image forming a tactile image wherein a tactile transition can be sensed by touching an interface between the at least the first and second discernible regions.

In accordance with another aspect of the invention, there is provided, a method of forming an image, comprising the steps of:

providing a substrate;

coating at least a first region of the substrate with magnetic non-spherical flakes;

magnetically orienting the magnetic non-spherical flakes within the first region by exposing the non-spherical flakes to a magnetic field oriented in a predetermined direction; and, c) impressing magnetically oriented non-spherical flakes within a sub-region of the first region to change alignment of flakes within the sub-region so as to form an image in the first region, wherein flakes within the sub-region have a visual appearance that is different from flakes within the first region outside of the sub-region; or, d) scribing magnetically oriented non-spherical flakes within a sub-region of the first region to change alignment of flakes within the sub-region and or to push away flakes from the first region, so as to form the image, wherein the sub-region has a visual appearance that is different from the first region outside of the sub-region.

BRIEF DESCRIPTION OF THE DRAWINGS

Exemplary embodiments of the invention will now be described in accordance with the drawings, in which.

DETAILED DESCRIPTION

Figure 1:
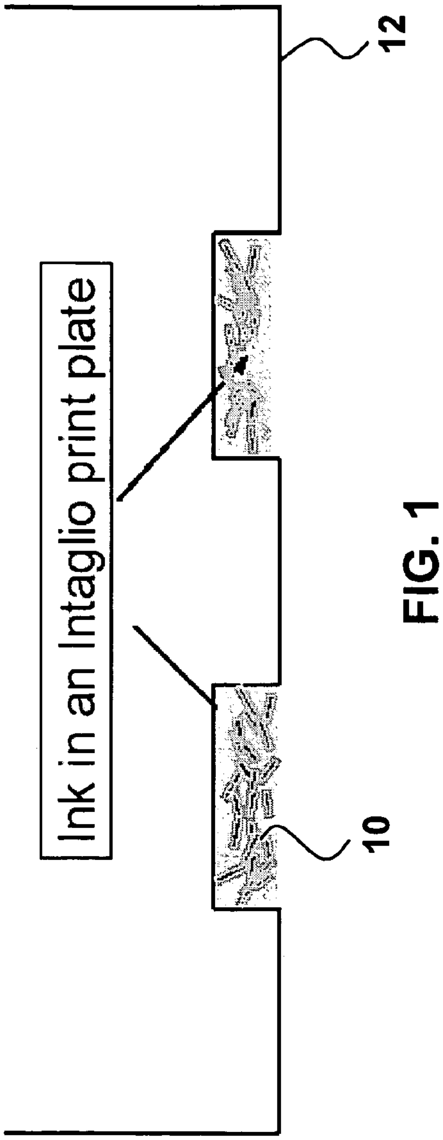
FIG. 1 is a cross-sectional view of an inked intaglio print plate, wherein the ink includes optically variable particles.
Figure 2:
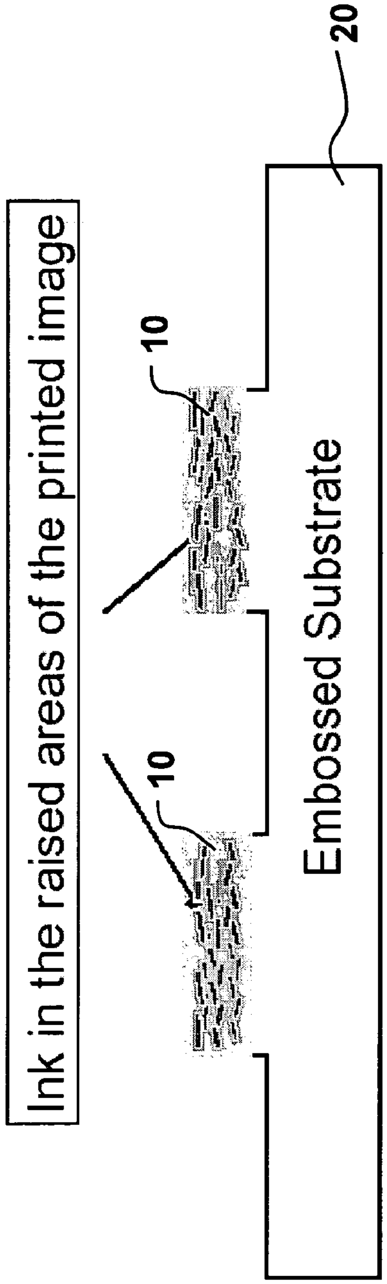
FIG. 2 is a diagram of an intaglio printed image having optically variable ink shown in raised portions after using the print plate of FIG. 2*a*.

Intaglio printing also known as recessed printing is a well accepted method to produce images. Intaglio printing can be used to print optically variable interference devices (OVIDs). In accordance with the method of this invention, FIG. 1 illustrates ink 10 in an intaglio print plate press 12 and FIG. 2 shows the resultant substrate 20 formed by printing with the print press shown in FIG. 1 An important feature of this invention is the tactility created from the embossing of a substrate resulting from applied, high print pressures. The ink can be formed of optically variable flakes suspended within a fluid carrier. Inks containing optically variable particles are described in U.S. Pat. Nos. 5,059,245 and 5,171,363 to Phillips et al. and are now well known. When using such OV inks with an Intaglio printing process the resulting image contains ink only in the raised areas of the print which correspond to the engraved areas of the print plate.

Figure 3:
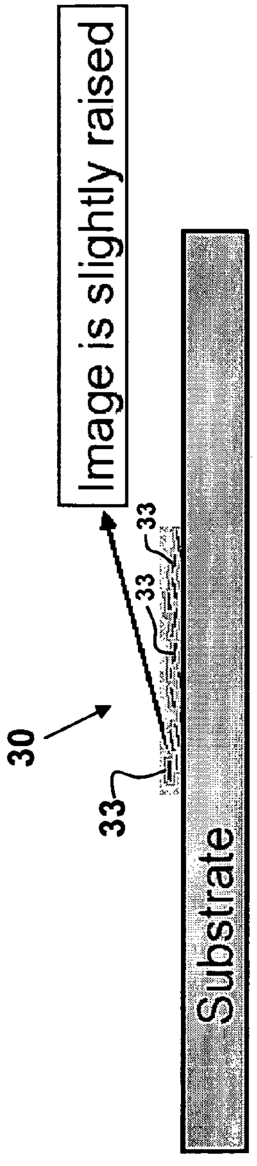
FIG. 3 is a side view of a substrate showing a slightly raised printed image thereon.

FIG. 3 shows a printed image 30, only slightly raised from the substrate. There are many ways in which optically variable inks can be applied to a substrate. Contrary to what might be imagined, generally, when the print head, or printing press is removed, the flakes within the carrier become disoriented and many of the flakes 33 do not lie parallel with the substrate. Thus, by simply printing, there is very little control of the orientation of the flakes within the printing ink. Being able to control the orientation of the flakes provides a means in which images can be designed and manufactured. The optical effects are dependent upon the orientation of the flakes, thus a great deal of effort has been devoted to providing means for controlling the orientation of the pigment flakes.

Figure 4B:
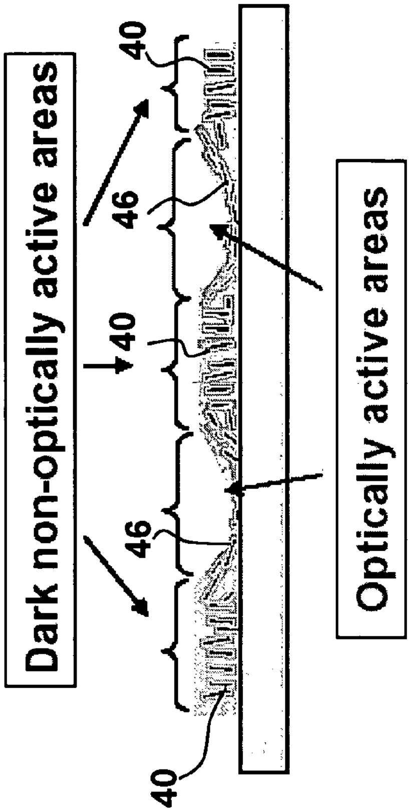
FIG. 4*b* is a side view of the image formed by the process depicted in FIG. 4*a*.
Figure 4A:
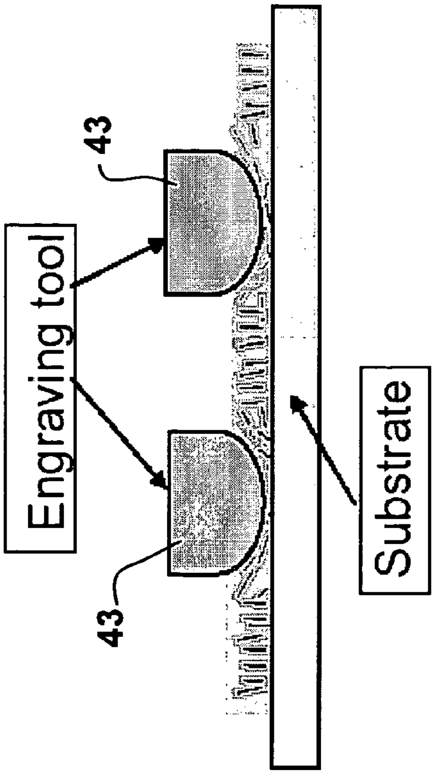
FIG. 4*a* is a side view of an image being formed by applying an engraving tool to a pre-inked substrate wherein the flakes within the ink have been magnetically aligned to be up-standing and substantially perpendicular with respect to the substrate.

Turning now to FIG. 4*a*, a first embodiment of the invention is shown, wherein magnetic flakes applied by a printing process are particularly adapted for use in flexographic printing, intaglio letterpress, litho-offset press, silk screen or gravure printing are first magnetically aligned so as to stand substantially vertical on their edges with respect to the substrate. Subsequently, but before the upstanding flakes 40 have cured in their oriented position, as shown, an engraving tool 43 is applied which forces some of the upstanding flakes to reorient and flatten with a slight pitch towards the sides of the tool. Essentially the flakes lie in an orientation which substantially conforms to the contacting surface of the tool. Therefore, most of the flakes on each side of the tool remain standing vertical with respect to the substrate and flakes directly under and about the engraving tool are parallel or slightly tilted with respect to the substrate. The visual optical effect of this shown in FIG. 4*b*, and is visually appealing. The upstanding flakes 40 are non-optically active appearing black and the flakes 46 that have been reoriented by the engraving tool 43, stand out for their designed optical effect. If optically variable (OV) flakes are used, the OV effects are noticeable where the flakes have been reoriented and are no longer upstanding. Whether the flakes are multilayer OV flakes or diffractive flakes, when they are upstanding on their edges with their flat sides perpendicular to the substrate, they appear black to the viewer.

Figure 4C:
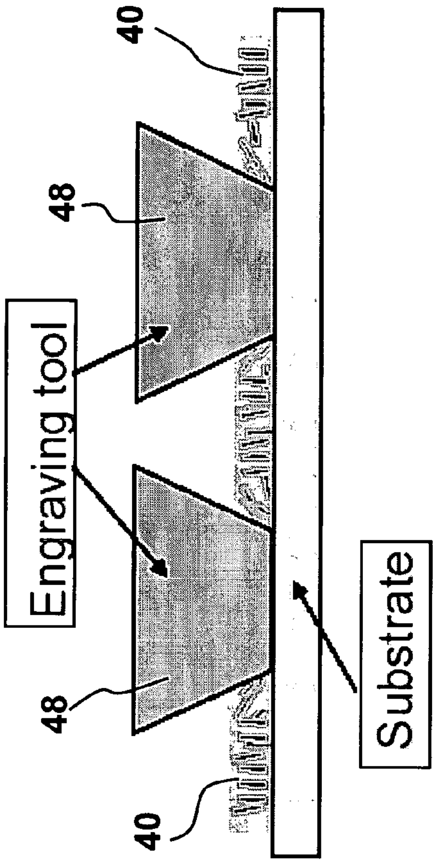
FIG. 4*c* is a side view of a side of an image being formed by applying an engraving tool to a pre-inked substrate wherein the flakes within the ink have been magnetically aligned to be up-standing and substantially perpendicular with respect to the substrate, and wherein the engraving tool has forced ink out from under the tool leaving voids of ink on the substrate.
Figure 4D:
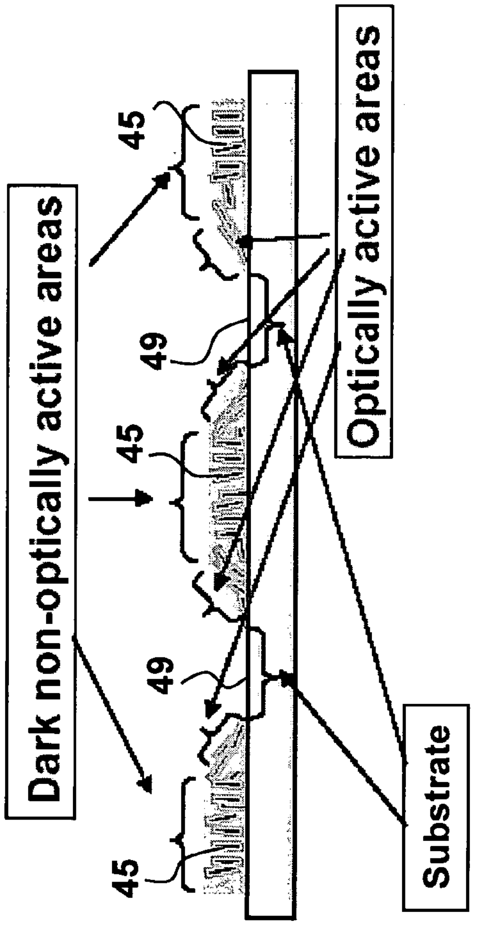
FIG. 4*d* is a side view of the image formed by the process depicted in FIG. 4*c*.

FIG. 4*c* illustrates another embodiment of this invention wherein the engraving tool 48 is formed to remove most or all of the high aspect ratio flakes as the tool makes contact with the substrate. The bottom of the engraved areas 49 may or may not contain ink depending of the depth, pressure, and the shape or material of the tool used to produce the engraved image. In this embodiment shown, the engraving tool 48 has a flat bottom and wedged sides which force out most of the ink under it. In FIG. 4*d*, in the region adjacent to where the ink is absent, that is the region where ink has been displaced to, the flakes are optically active, however the upstanding flakes 45 vertical to the substrate appear black and are non-optically active.

The images formed by the processes of FIG. 4*a* and FIG. 4*c* have a high degree of tactility. A user can feel a transition from the raised non-optically active regions to the regions where the flakes are optically active. This additional feature provides increased security for the device it is attached to. Furthermore, this tactility is particularly useful as feature that can be discerned by the blind to validate or authenticate an article such as a banknote or security document.

Figure 5:
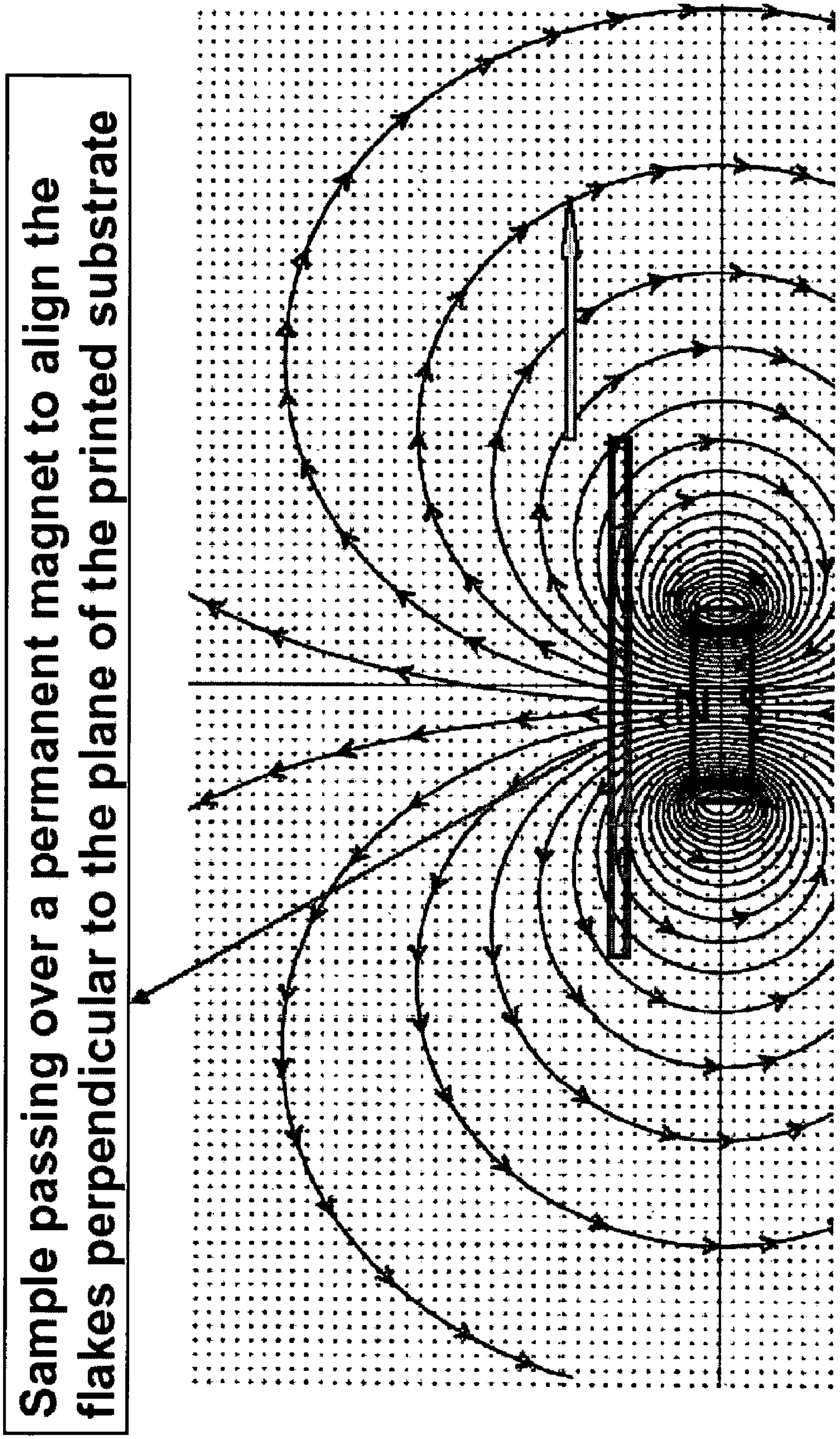
FIG. 5 is a diagram illustrating a substrate in accordance with this invention, having flakes applied thereon passing over a permanent magnet to align the flakes perpendicular to the plane of the printed substrate.

Other print process, like letterpress, screen, flexo, pad printing, ink jet, may present varying degrees of tactility based on the final thickness of the dried ink layer FIG. 5 illustrates a system wherein a substrate is passed over a permanent magnet and wherein the field lines toward the centre are used to align the flakes so that they are parallel to the substrate.

Figure 6:
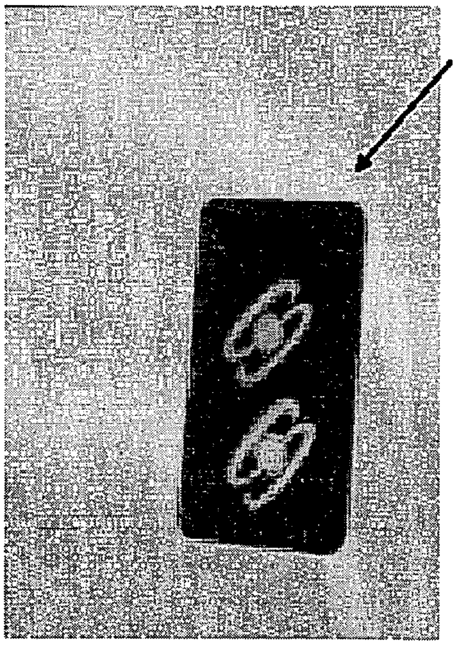
FIG. 6 is a black and white photograph of an image in accordance with this invention, wherein the image has two symbols capable for shifting from gold to green shown adjacent to a dark background of upstanding flakes disposed upon a white background.

FIG. 6 is a black and white photograph of an image in accordance with this invention, wherein the image has two symbols capable for shifting from gold to green shown adjacent to a dark background of upstanding flakes disposed upon a while background.

Figure 7:
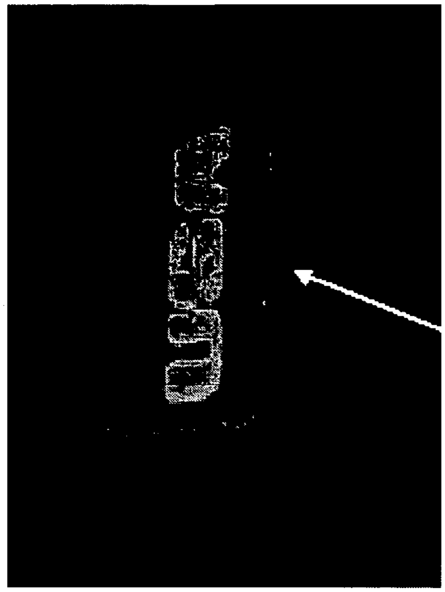
FIG. 7 is black and white photograph of an image having a dark portion and a lighter portion with the letters "USA" embossed therein wherein the embossed letters shift in color from gold to green in dependence upon angle of incident light or viewing angle.

Referring now to FIG. 7 an image is shown made in accordance with the method of this invention wherein flakes are first aligned so that they are perpendicular to the substrate, upstanding on their edges. The letters "USA" are visible as the flakes dispersed within the "USA" have been engraved with the engraving tool so that they lie parallel to the substrate and orthogonal to the upstanding black-appearing flakes. Since the letters "USA" have been impressed into the substrate with the engraving tool, this region are recessed relative to the region with the upstanding flakes and are detectable to the touch. During the forming of an image, standard curing methods are employed so ensure that the flakes are set immovably in their desired orientations. For example UV cured paints or inks can be used providing a means of quickly curing the arranged flakes before they relax or loose their intended orientation. In the image shown, the low brightness background does not display any optically variable effect with changes in the angle of viewing or illumination. However, the adjacent areas bearing "USA" present strong optical effects with changes in the illumination or viewing angles due to the different flake alignment.

In contrast to standard printed devices where the image may display some degree of tactility from the raised areas of the printed image, the tactility of this security device comes from the special optical effect areas that have been engraved into the low brightness background.

Within this specification, the term applied magnetic field connotes providing a magnetic field that is sufficient to align magnetic flakes along the magnetic field lines. This may be achieved by disposing the inked or painted substrate near or adjacent to a magnet, or by providing a means for generating a magnetic field and exposing the flakes to the field.

Mechanically impressing the flakes can be done by impressing the flakes with an engraving tool, a pen, or pencil or any form of mechanical means which will push or sweep the flakes aside or that will mechanically force the flakes into a different orientation from an upstanding substantially vertical position with respect to the substrate. The term mechanically impressing is to include wiping away magnetically aligned flakes within a target region.

Figure 8:
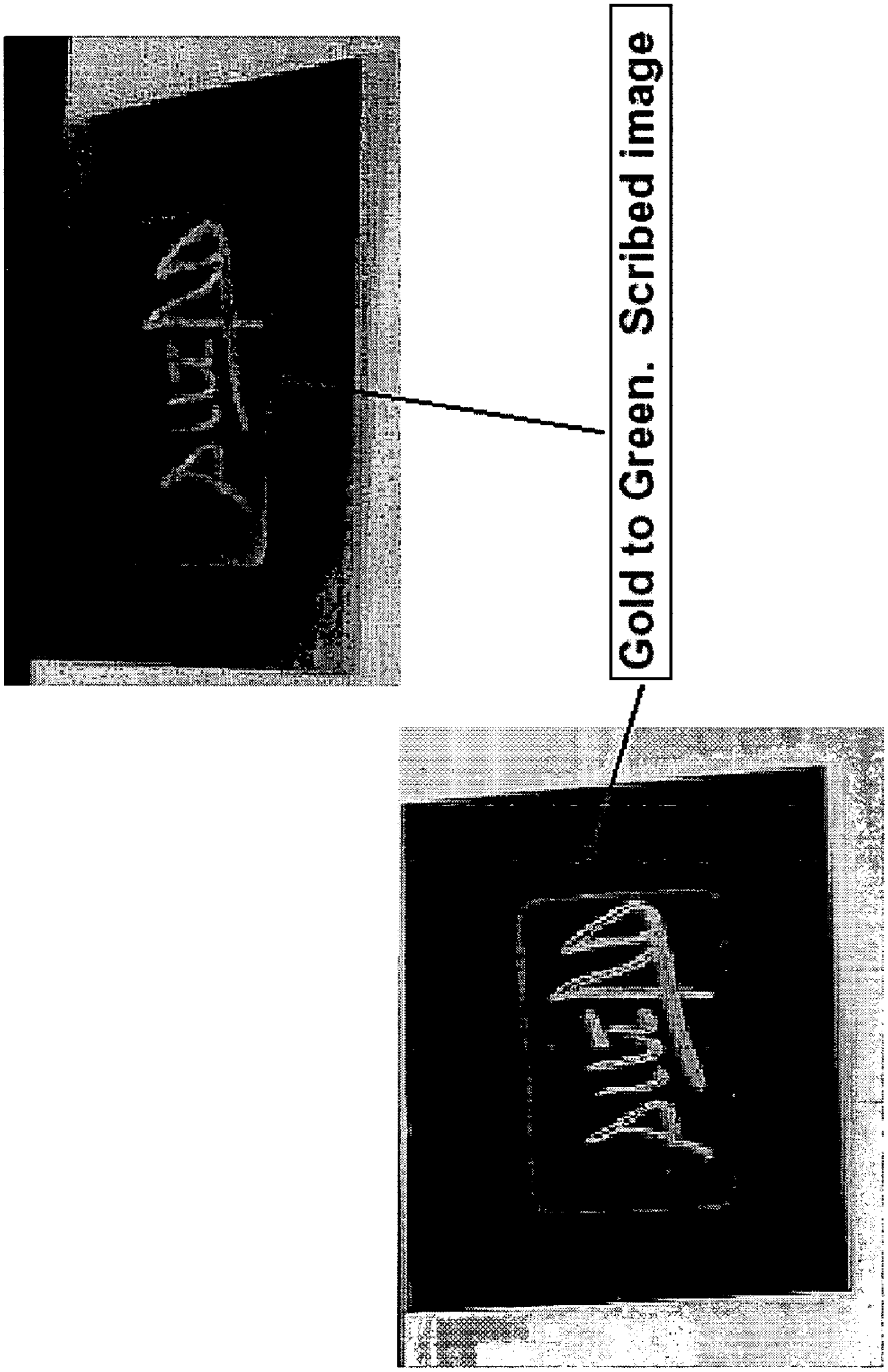
FIG. 8 is a photograph of a scribed image in the form of a signature wherein the background are black appearing upstanding flakes and the signature itself is gold to green dependent upon angle of incident light or viewing angle.
Figure 9:
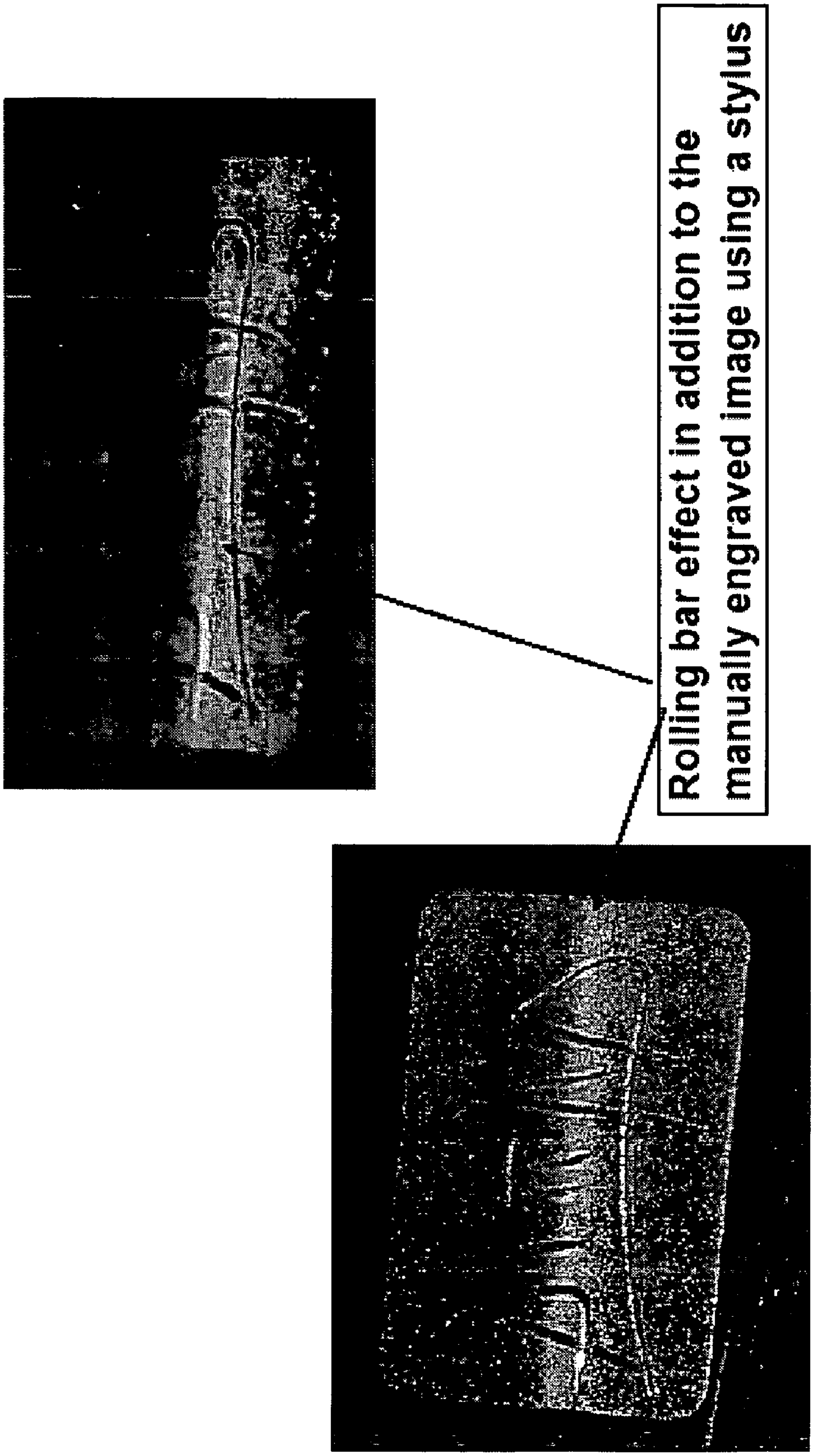
FIG. 9 is a photograph of a scribed image similar to the one shown in FIG. 8, wherein the additional step of introducing the scribed image to a magnetic field so as to produce a rolling bar affect, is added.

For example after the flakes are oriented by the magnetic field to be upstanding with respect to the substrate, one can use a pen or pencil to scribe text or a signature that will be visually and tactilely distinguishable from its background as shown in FIG. 8. The pen or pencil both flattens flakes in its path and tends to move some flakes away from its same path.

Providing a signature that is recessed from it's background and visually distinguishable from it's background wherein color shifting features are associated therewith, offers a significant advantage in the field of security enhancements.

In addition to realizing the image shown in FIG. 8, providing a rolling bar affect or other optical affects can be included simply by adding an additional step before curing takes place.

Figure 10:
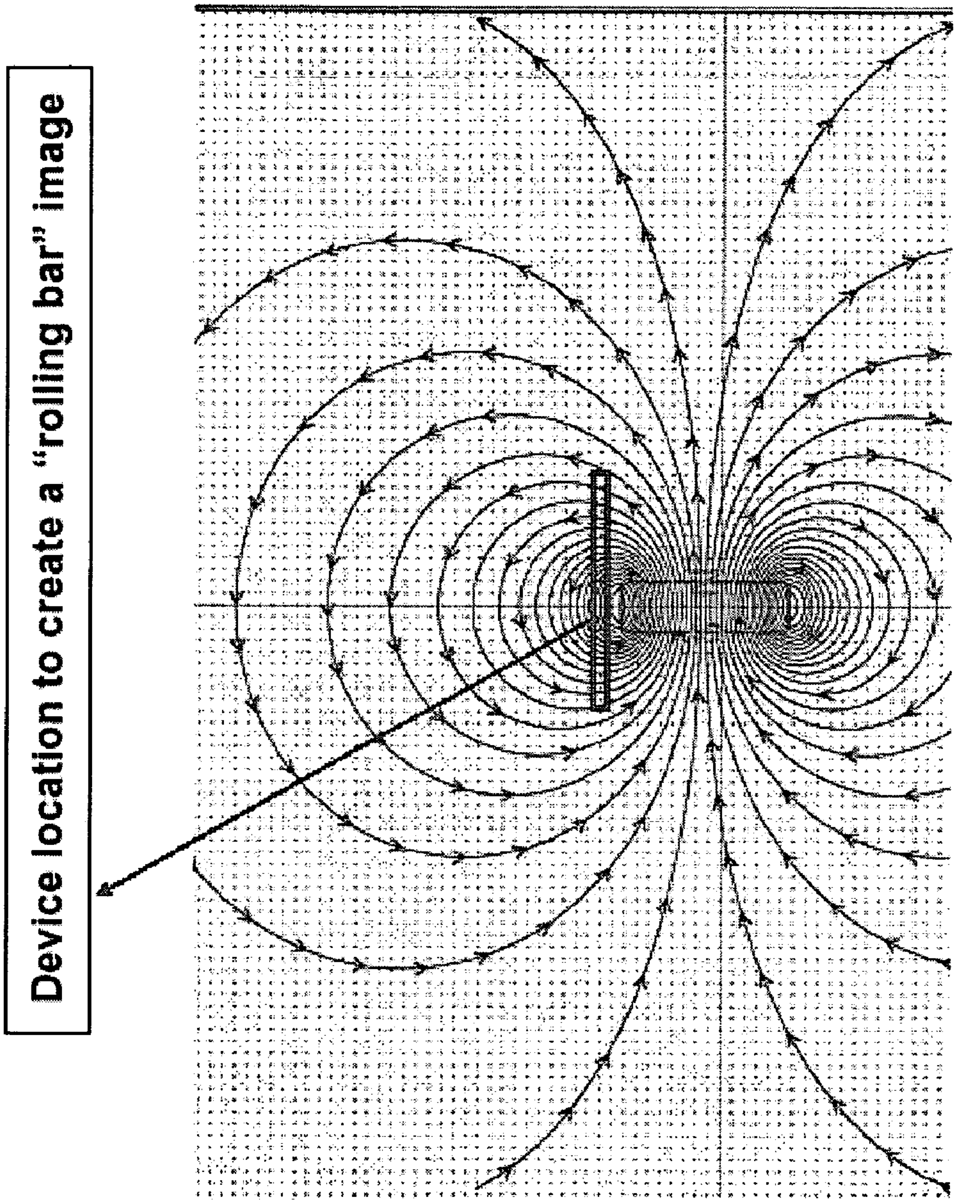
FIG. 10 is a diagram illustrating a magnetic field for providing a rolling bar affect.

Turning now to FIG. 10, an image bearing a signature scribed with a pen, pencil or scribing tool into the background of flakes thereby flattening the flakes or removing the flakes from the region of the signature. Preferably, after this step of inscribing a signature or other tooled feature, a rolling bar affect can be added. This is accomplished by placing the engraved image in a magnetic field that will align the flakes about the signature to form a rolling bar. Detailed steps to making a rolling bar can be found in United States Patent application numbers 20040051297 and 20050106367 in the name of Raksha et al.

Alternatively, in another embodiment of this invention, one can provide a magnetic optically variable coating to a substrate and align the magnetic optically variable flakes in a particular desired pattern by using magnetic fields to provide an optical feature such as a rolling bar, for example, forming one or more rolling bars, and subsequently scribe the substrate to provide a tactile feature prior to curing the coating.

EXAMPLES

Example 1

An optically variable image was produced using a 7 layer magnetic Gold to Green Optical variable design as follows:

10 nm Cr/4 QW MgF2 @ 604 nm/80 nm Al/50 nm Ni/80 nm Al/4 QW MgF2 @ 604 nm/10 nm Cr.

The particle size distribution is between 10 to 30 microns by 1.1 microns in thickness.

An ink was formulated comprising 80% by weight of a UV curable silk screen ink base and 20% of pigment. The ink was applied by silk screen printing over the black and white areas of a Leneta card. Once the ink was applied, the printed sample, containing no engraved image, was passed over a strong permanent magnet. The magnet's pole orientation was such that the magnetic flux lines were perpendicular to the plane of the Leneta card. As a result, a significant number of the high aspect ratio flakes aligned themselves perpendicular to the substrate, producing the dark areas of the device. The dark areas are due to the trapping of light from the pigment alignment, and occur independently of the substrate lightness.

An image was created using a metallic stamp under controlled, light pressure which causes the flakes to realign in such a way that light is now reflected by the pigment. The observed color changes from gold to green in accordance with the previously referenced optical interference design. The Leneta card was then passed under a high power UV lamp to cure the ink and permanently fix the pigment alignment.

Example 2

An optically variable image was produced using a 7 layer magnetic Gold to Green Optical variable design as follows:

10 nm Cr/4 QW MgF2 @ 604 nm/80 nm Al/50 nm Ni/80 nm Al/4 QW MgF2 @ 604 nm/10 nm Cr.

The particle size distribution is between 10 to 30 microns by 1.1 micron thick.

Similar to Example 1, an ink was formulated comprising 80% by weight of a UV curable silk screen ink base and 20% of pigment. The ink was applied by silk screen printing over the black and white areas of a Leneta card. Once the ink was applied, the printed sample, containing no engraved image, was passed over a strong permanent magnet. The magnet's pole orientation was such that the magnetic flux lines were perpendicular to the plane of the Leneta card.

In this embodiment, the image was manually engraved using a stylus. Due to the nature of the stylus, the bottom of the engravings do not contain any ink as it pushes all of the ink aside. The walls of the engraved areas change from gold to green as the sample is tilted from near normal to high angles of viewing. As in Embodiment 1, the sample was UV cured afterwards.

Example 3

An optically variable image was produced using a 7 layer magnetic Magenta to Green Optical variable design as follows:

10 nm Cr/4 QW MgF2 @ 665 nm/80 nm Al/50 nm Ni/80 nm Al/4 QW MgF2 @ 665 nm/10 nm Cr.

The particle size distribution is between 10 to 30 microns by 1.2 micron thick.

The method preparation is similar to the one described in Example 1, with the difference that in this example, a rubber stamp in the shape of a hummingbird was used to create the image. In this case, the color of the image changes from Magenta to Green as the sample is tilted from near normal to high angles of viewing.

Example 4

An image was produced using a 7 layer magnetic Green to Blue diffractive Optical variable design as follows:

10 nm Cr/4 QW MgF2 @ 530 nm/80 nm Al/50 nm Ni/80 nm Al/4 QW MgF2 @ 530 nm/10 nm Cr.

A foil with a linear grating frequency of 500 l/mm, corresponding to a 2 micron separation between grooves, was used as the substrate to produce the pigment's diffractive properties. The particle size distribution is between 10 to 30 microns by 1 micron thick.

As in the case of the previous embodiments, the flakes were aligned perpendicular to the substrate. In this case the flakes have a tendency to have their diffractive grooves align parallel to the applied field, and thus perpendicular to the plane of the substrate.

As in the case of Example 2, the image was manually engraved using a stylus.

In this embodiment, an extra alignment was produced after the engraving step by passing the sample over a second permanent magnet positioned in such a way that the magnetic flux lines were oriented in a predetermined direction as is shown in FIG. 10. As a result of this second alignment, the image shows a rolling bar effect.

Example 5

The OVID was produced using a 7 layer magnetic Magenta to Green Optical variable design as follows:

10 nm Cr/4 QW MgF2 @ 665 nm/80 nm Al/50 nm Ni/80 nm Al/4 QW MgF2 @ 665 nm/10 nm Cr.

The particle size distribution is between 10 to 30 microns by 1.2 micron thick.

An ink was formulated comprising 80% by weight of a UV curable silk screen ink base and 20% of pigment. The ink was this time applied using a doctor blade over the black and white areas of a Leneta card. As previous embodiments, once the ink was applied, the printed sample, containing no engraved image, was passed over a strong permanent magnet to align the flakes perpendicular to the substrate producing a dark area. As in previous embodiments, the image can be produced using a stylus, a rubber stamp, passing the sample under an engraved cylindrical roll, or any other method to produce an engraved image. The engraved areas, over the dark background, change from magenta to green in accordance to its optical interference design. Finally, the samples are UV cured to fix the position of the pigment.

Although a UV curing ink was used, other types of curing ink can be used in accordance with this invention.

Of course numerous other embodiments may be envisaged without departing from the spirit and scope of the invention. Preferred embodiments of this invention utilize optically variable magnetically alignable flakes or particles, however, magnetically alignable flakes having other optical properties can be utilized, such as diffractive flakes or other metallic flakes.

What is claimed is:

1. A method of forming an image, comprising the steps of:

providing a substrate;

coating at least a first region of the substrate with magnetic flakes, each of said magnetic flakes having first and second opposing substantially parallel sides;

aligning the magnetic flakes within the first region so that their opposing sides are substantially orthogonal to the substrate by exposing the magnetic flakes coated on the first region of the substrate to a magnetic field oriented in a predetermined direction; and, impressing magnetically oriented flakes within a sub-region of the first region to change alignment of flakes within the sub-region so as to form an image in the first region, wherein flakes within the sub-region have a visual appearance that is different from flakes within the first region outside of the sub-region.

2. A method as defined in claim 1, wherein the step of coating is performed by printing, painting, or spraying the substrate with a carrier including the magnetic flakes.

3. A method as defined in claim 1, wherein the flakes are within a carrier to form an ink or paint, and wherein the step of impressing includes the use of an engraving tool.

4. A method of forming an image, comprising the steps of:

providing a substrate;

coating at least a first region of the substrate with magnetic flakes;

magnetically orienting the magnetic flakes within the first region by exposing the non-spherical flakes to a magnetic field oriented in a predetermined direction; and, a) impressing magnetically oriented flakes with within a sub-region of the first region to change alignment of flakes within the sub-region so as to form an image in the first region, wherein flakes within the sub-region have a visual appearance that is different from flakes within the first region outside of the sub-region; or, b) scribing magnetically oriented flakes within a sub-region of the first region to change alignment of flakes within the sub-region and or to push away flakes from the first region, so as to form the image, wherein the sub-region has a visual appearance that is different from the first region outside of the sub-region.

* * * * *